Dec. 10, 1968  R. T. HUCKS, JR  3,415,544
PIPE COUPLING
Filed Dec. 27, 1965
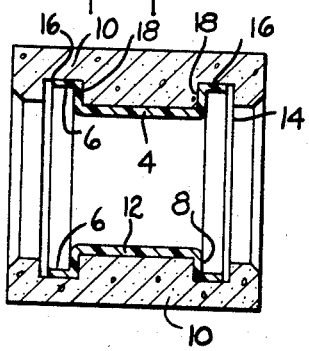
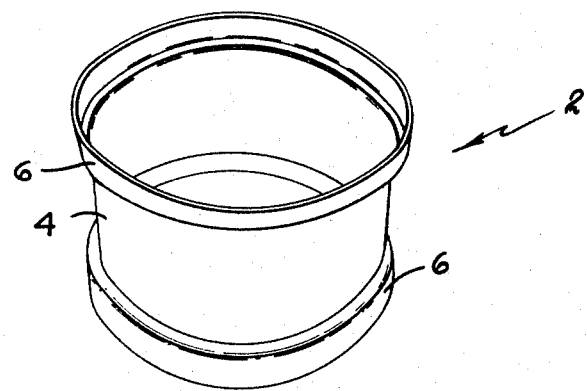
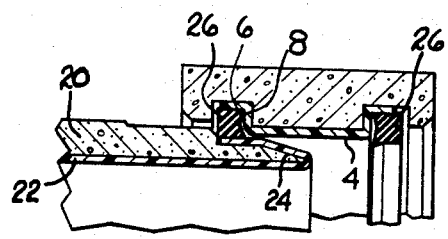
INVENTOR.
Robert Tyler Hucks, Jr.
BY
John A. McKinney
Attorney 3,415,544
PIPE COUPLING
Robert Tyler Hucks, Jr., Somerville, N.J., assignor to Johns-Manville Corporation, New York, N.Y., a corporation of New York
Filed Dec. 27, 1965, Ser. No. 516,384
3 Claims. (Cl. 285—55)

ABSTRACT OF THE DISCLOSURE

A thermoplastic plastic coupling liner for the inner surface of an asbestos-cement coupling having a pair of spaced annular grooves wherein the coupling liner may be folded upon itself and inserted into the coupling.

---

This invention relates to a coupling for fluid conduits, such as pipes, wherein the coupling is provided with a protective covering for its inner surfaces. The invention is particularly suited for providing a protective covering for the inner surface of a coupling having a pair of spaced grooves in its inner surface, which grooves are adapted to receive rubber rings for providing rubber ring joints, of the types disclosed in Turner U.S. Patent No. 2,294,142; Heisler U.S. Patent No. 2,738,992; Gerin U.S. Patent No. 3,066,961; and Kazienko, U.S. Patent No. 3,137,502 and used for joining adjacent ends of pipe provided with a protective coating on their fluid handling surfaces.

In Hucks U.S. Patent No. 3,219,472, there is disclosed a coating method which has been used extensively in the commercial protection of epoxy lined asbestos-cement pipe. However, extreme difficulties have been encountered in trying to adapt the coating method described therein to provide a protective covering for the inner surface of a coupling. It is very difficult to cast a coating on the generally radially extending end walls of the grooves in the coupling. Also, there is a tendency for the coating material to be urged by the centrifugal action of the rotating coupling into the groove so as to form a coating of increased thickness on the generally cylindrical surface of the inner wall of the coupling groove. This action is undesirable since the diameter of this inner wall of the coupling groove must be maintained under close tolerance for the proper functioning of the rubber ring gasket during and after the assembly of the rubber ring joint. Attempts have been made to provide a protective coating to the inner surface of the coupling by hand brushing. It has been found substantially impossible by hand brushing consistently to provide these surfaces with a coating which has sufficient thickness and uniformity to provide adequate protection against failure of the coating when in contact with aggressive fluids.

The primary object of this invention is to provide a coupling for fluid conduits with a protective covering of a smooth, blister-free, chemically resistant, and fluid-impervious material on the portions of its inner surface including the grooves, which are normally contacted by the fluid being handled.

In the preferred embodiment of the invention, the inner surface of the coupling is provided with a protective covering comprising an integral one-piece liner having a configuration complementary to the major portion of the inner surface of the coupling including the grooves. The liner must provide a smooth, blister-free, chemically resistant, and fluid-impervious surface for the coupling, and at the same time, must have sufficient flexibility to allow it to be folded upon itself an amount sufficient to allow it to be inserted into the coupling. After being inserted within the coupling, the liner also must be sufficiently flexible to allow it to return to its original configuration so that the outer surface of the liner is in close intimate relationship with the inner surface of the coupling including the grooves.

The invention will be more fully understood and further objects and advantages thereof will become apparent when reference is made to the following detailed description of a preferred embodiment of the invention and the accompanying drawings in which:

FIG. 1 is a pictorial representation of a coupling liner of the instant invention;

FIG. 2 is a view in cross section illustrating a portion of a coupling with a liner positioned therein; and FIG. 3 is a view in cross section illustrating a portion of an assembled pipe joint.

Referring to the drawing, there is illustrated a coupling liner 2 comprising a thermoplastic material and having a generally cylindrical section 4 and two spaced generally cylindrical portions 6, each having an outside diameter greater than the outside diameter of the generally cylindrical section 4 and integrally connected to the section 4 by a generally radially extending wall 8. The coupling liner 2 has a configuration for mating with the inner surfaces of as asbestos-cement coupling 10 as illustrated in FIG. 2. The asbestos-cement coupling 10 comprises a sleeve type coupling having a generally cylindrical surface 12 between a pair of spaced annular grooves 14. Each groove 14 has a radially outer wall 16 and a generally radially extending wall 18 providing a continuous surface between the outer wall 16 and the inner surface 12. As illustrated in FIG. 2, the liner 2 fits snugly within the coupling 10 with the outer surface of the central section 4 in contact with the inner surface 12, the outer surface of each portion 6 in contact with the inner surface of each wall 16, and the mating surfaces of the walls 8 and 18 in contact with each other. The axial extent of each portion 6 is less than the axial extent of each wall 16 to insure the proper seating of the liner in the coupling and the contact between the inner surface of the wall 16 and the outer surface of the portion 6.

In FIG. 3, there is illustrated a portion of a pipe joint comprising a coupling 10 and a liner 2 of the instant application, a pipe 20 having a protective covering over its inner surface 22 and the outer surface 24 of the pipe end, and a rubber sealing gasket between the protective covering 20 on the surface 24 and the inner surface of the portion 6. It is readily apparent that the joint illustrated in FIG. 3 cooperates with the other portions of the pipe to provide complete protection for the inner surfaces of a pipe line formed from components of this nature.

The liner 2 of the instant invention should have a thickness great enough to provide ample protection for the surfaces of the coupling but it should be thin enough to hold the cost to a minimum, to maintain as near as possible the true diameter of the coupling, and to provide sufficient flexibility to allow it to be inserted into the coupling. In the preferred embodiment of the invention, the liner comprises a polyethylene copolymer material. Experience has shown that a sleeve 2 comprising a polyethylene copolymer material should have a wall thickness between about 15 to 60 mils. The polyethylene copolymer material may comprise either an ethylene acrylic copolymer, such as that marketed by Union Carbide under the trade designation DPDB6167, or a vinyl acetate copolymer, such as that marketed by U.S. Industrial Chemicals Company under the trade designation UE630X. In order to obtain the desired degree of flexibility, the material in the liner should have a 2% secant modulus of elasticity of between about 3500 to 15,000 p.s.i. as determined by ASTM Test Procedure D638–60T.

Liners comprising a polyethylene copolymer material with a thickness between about 15 and 60 mils and having a configuration similar to that illustrated in FIG. 1 have been formed. These liners have been folded upon themselves and inserted into couplings of the type illustrated in FIG. 2 and unfolded while within the coupling so that the complete outer surface of the liner is in close intimate relationship with the complete inner surface of the central section 12 and the walls 16 and 18 of the grooves of the coupling. Each liner had a 2% secant modulus of elasticity of between about 3500 to 15,000 p.s.i. so that the folding and unfolding of the liners was accomplished easily and without critical damage to the liner. After the liners had been positioned within the coupling, joints similar to the one illustrated in FIG. 3 were made with appropriate pipe ends and rubber ring gaskets. Each pipe comprised a standard, commercial, lined asbestos-cement pipe; each coupling was a standard, commercial, asbestos-cement coupling; and each gasket was a standard, commercial, rubber ring gasket. Each joint was assembled generally in the same manner normally used with asbestos-cement pipe and coupling. The joints were tested to the specifications set forth for the associated asbestos-cement pipe and couplings and were satisfactory. Also, fluids normally aggressive against asbestos-cement were passed through the assembled units with no damage to the asbestos-cement pipe or couplings.

While the invention has been described in rather full detail, it will be understood that these details need not be strictly adhered to and that various changes and modifications may suggest themselves to one skilled in the art, all falling within the scope of the invention as defined by the subjoined claims.

What I claim is:
1. A coupling for use in joining together adjacent pipe ends comprising:
   (a) a rigid coupling having a pair of spaced annular grooves, each of said grooves having a radially outer wall in the inner surface thereof,
   (b) a central section between said grooves having a generally cylindrical inner surface,
   (c) said central section having an inner diameter less than the inner diameter of the radially outer wall of each of said grooves,
   (d) a liner for said coupling comprising:
      (1) an integral member comprising a thermoplastic resin material and having an outer surface complementary to the inner surface of said central section and adjacent portions of said grooves of said coupling,
      (2) said outer surface of said liner being in close intimate relationship with the inner surface of said central section and at least portions of said radially outer walls of said grooves of said coupling,
      (3) said liner having a radial thickness of between about 15 and 60 mils,
      (4) said liner comprising a material having a 2% secant modulus of elasticity between about 3500 and 15,000 p.s.i. so that said liner has sufficient flexibility to allow it to be folded upon itself and inserted into said coupling.
2. A coupling as defined in claim 1 wherein said liner comprises:
   (a) a polyethylene copolymer material.
3. A coupling as defined in claim 2 wherein:
   (a) the portion of said liner complementary to said radially outer wall of said groove has an axial extent less than the axial extent of said radially outer wall of said groove.

References Cited
UNITED STATES PATENTS

| | | | |
|---|---|---|---|
| 589,216 | 8/1897 | McKee | 285—239 |
| 3,078,827 | 2/1963 | Oelke et al. | 285—239 X |
| 3,120,967 | 2/1964 | Kazienko | 285—369 X |
| 3,192,612 | 7/1965 | Elliott et al. | 285—55 X |
| 3,307,860 | 3/1967 | Blount et al. | 285—55 |

CARL W. TOMLIN, Primary Examiner.

DAVE W. AROLA, Assistant Examiner.

U.S. Cl. X.R.

285—230, 369, 349; 138—140